Oct. 7, 1924.
W. E. WINE ET AL
1,510,641
SIDE BEARING
Filed Feb. 3, 1923
2 Sheets-Sheet 1
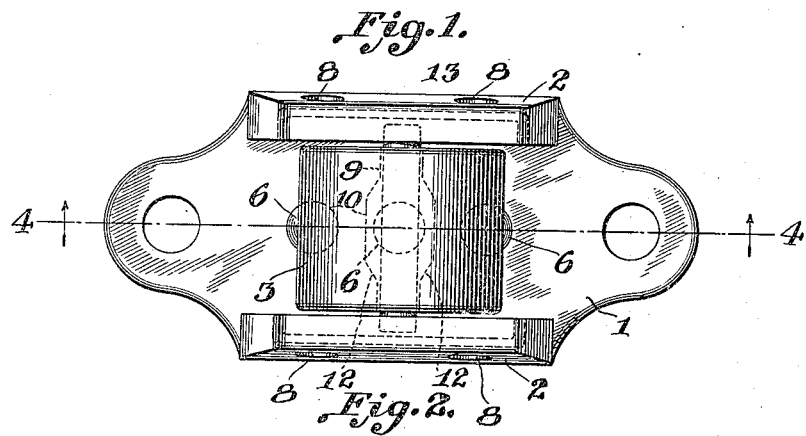
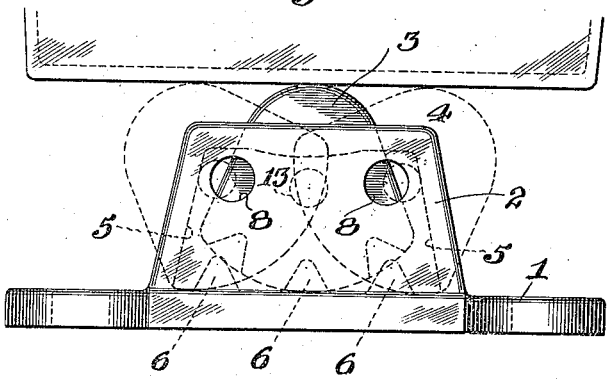
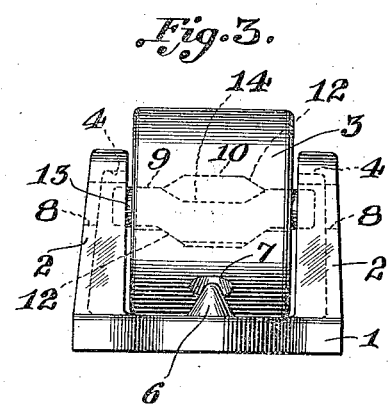
Inventors
W. E. Wine
W. F. Cremean
By Parker Cook
Attorney Oct. 7, 1924.   1,510,641
W. E. WINE ET AL
SIDE BEARING
Filed Feb. 3, 1923   2 Sheets-Sheet 2
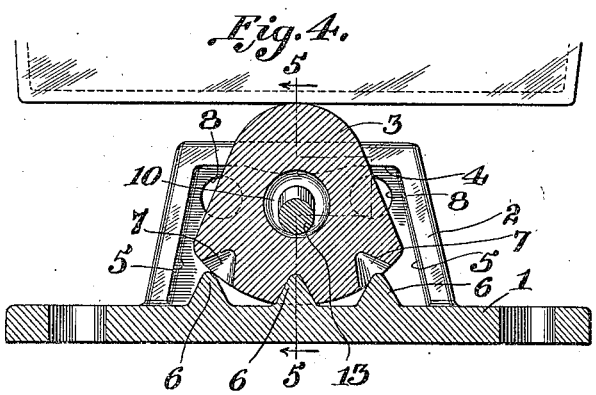
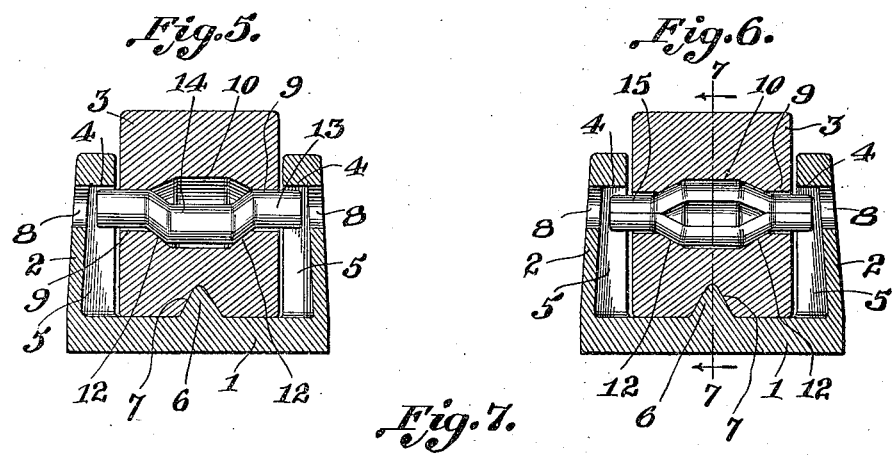
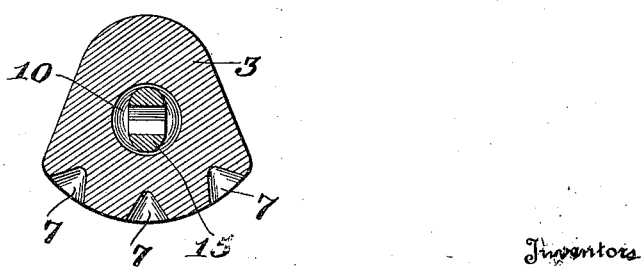
Inventors
W. E. Wine
W. F. Cremean
By Parker Cook
Attorney Patented Oct. 7, 1924.

1,510,641

UNITED STATES PATENT OFFICE.

WILLIAM E. WINE AND WILLIAM F. CREMEAN, OF TOLEDO, OHIO.

SIDE BEARING.

Application filed February 3, 1923. Serial No. 616,651.

*To all whom it may concern:*

Be it known that WILLIAM E. WINE and WILLIAM F. CREMEAN, citizens of the United States, residing at Toledo, in the county of Lucas and State of Ohio, have invented certain new and useful Improvements in Side Bearings, of which the following is a specification.

Our invention relates to new and useful improvements in self-centering side bearings of the well known "Wine type" and more particularly to the housing and the means of retaining the roller in the same.

Heretofore in the "Wine" self-centering side bearings there has been provided a transversely extending center retaining pin that is passed through an opening in the housing and then through an opening or aperture extending through the roller, the length of the pin being such that it extends slightly beyond the opposite sides of the roller and moves along two tracks or flanges formed on the inner sides of the housing, a cotter pin then being inserted across the opening in the housing so that the pin can not accidently work out of the roller and the housing.

If, however, the cotter pin became damaged there was a possibility of the pin working from the roller and out through the housing and permitting the roller to jam or cease to properly function.

One of the principal objects therefore of the present invention is to provide a self-centering side bearing, the roller of which has a passage therethrough, the central portion of which is enlarged to accommodate a pin or pins which are angularly bent or distorted so that when once forced into place will not slip nor become accidently removed and in fact will have to be driven out with relatively great force when it is desired to remove the same.

Still another object of the invention is to place the openings or apertures in the housing for the insertion of the pin or pins into the roller, near the opposite ends of the path of travel of the roller, rather than at the center of the housing as in the former "Wine type," as the roller being self centering is for the greatest part of its activity at the central point of the housing. Therefore, placing the openings at or near the ends of the path of travel of the roller, still further safeguards the accidental loss of the pin if for any unexplainable reason it should start to work from its forced position in the roller.

Still another object of the invention is to form the housing of a base plate and two integral side walls, the ordinary end walls being dispensed with thus forming a housing of lighter weight than in the former type and also one that is more simple to cast.

With these and other objects in view which will become apparent as the specification proceeds, the invention consists in certain new and novel constructions in combination parts as will be hereinafter more fully described and pointed out in the claims.

Referring now to the drawings showing a preferred form and a slightly modified form of the invention Fig. 1 is a top plan view of the bearing, the passageway in the roller as well as the pin being shown in dotted lines.

Fig. 2 is a side elevation showing the limits of travel of the roller in dotted lines.

Fig. 3 is an end view, the passageway, the roller, and the pin being shown in dotted lines.

Fig. 4 is a sectional view taken on line 4—4 of Fig. 1.

Fig. 5 is a vertical sectional view taken on line 5—5 of Fig. 4.

Fig. 6 is a similar view and showing a modified form of retaining pin, the pin being shown in this instance formed of two parts, and Fig. 7 is a sectional view taken on line 7—7 of Fig. 6.

Referring now more specifically to the several views showing the preferred form there will be seen that there is provided the housing which comprises the base plate 1, which has its opposite ends slightly reduced which ends are drilled for the reception of bolts (not shown) for securing the bearing to the truck or the car body. At the opposite sides of this plate are the parallel side walls 2 which are preferably formed integral with the base plate 1 these side walls forming the housing for the roller 3 which will be shortly described more in detail.

In the former type of "Wine" sidebearing the housing has always been box-like in cross section, while in the present application it will be noticed that the end walls are dispensed with thereby effecting a saving in metal as well as making the housing a more simple one to cast.

From the several views it will be seen that these side walls 2 are cut out on their inner surfaces to thereby provide the inner overhanging flanges 4 and the sloping inner flanges 5 or, in other words one continuous encircling flange on the inner surfaces of each of the side walls. Arranged in alignment on the upper surface of the base plate 1 and centrally positioned between the side walls 2 are the three projections or teats 6 that register with and fit within the indentations 7 formed in the bottom surface of the roller 3, the objects of these cooperating parts being to keep the roller in proper alignment between the walls during its forward and rearward movement.

Also formed in each of the two side walls 2 and near their opposite ends are the openings or apertures 8 which as will be noticed are spaced a slight distance below the overhanging flanges 4 and a slight distance from the edges of the sloping end flanges 5.

Referring now more in particular to the roller and to the manner in which it is properly retained with the side walls it will be seen that it is arcuate at its top and bottom having the plane sides, the arc at the bottom being greater than the upper arc so that the roller will always tend to center itself.

Extending transversely through the roller and centrally from its side is the passageway 9 which is enlarged as at 10 thus producing the sloping walls 12 in the passageway.

Referring now to Figs. 3, 4, and 5 there is shown the retaining pin 13 which is to be formed of highly tempered spring steel having a central portion 14 bent or distorted, the angular portions being approximately the angle of the walls 12 of the passageway in the roller.

The diameter of the pin is slightly less than that of the diameter of the passageway 9 at its ends, while its length is such that its ends when in place will underlie the overhanging flanges 4 and abut against the sloping flanges 5 at the ends of the side walls.

After the roller is placed in position between the side walls it will be rolled slightly from its vertical position till the passageway 9 registers with one of the holes 8 formed in either of the side walls 2, after which the pin 13 will be driven with a hammer through the passageway in the roller so that the bent portion of the pin will spring in place in enlarged portion of the passageway 9, the angular portions of the pin fitting within the walls 12 and thus securely locking the pin in position.

After the pin is in place it cannot become accidently disengaged and the roller though free to move is locked within the housing and of course is limited in its forward and rearward movements. Also by providing the holes 8, two in each side wall the pin may be inserted from either side wall or from either end thereof.

Referring now to the slightly modified form as shown in Figs. 6 and 7 it will be seen that a composite pin 15 is used made up of two parts each one being "half round" and superimposed. These two parts may be inserted one at a time and function like the single pin 13 heretofore described a greater contacting area however being had with the walls of the passageway forming the roller. They are also somewhat easier to install and the pin possesses somewhat more resiliency than a pin made from a solid piece.

From the foregoing it will be seen that we have provided a self-centering side bearing wherein the housing consists of simply a base and two side walls and wherein the roller is so constructed that after it has been placed in the housing and a retaining pin inserted, which may be a unitary one or may be made up of two portions, and driven in place, it will be impossible for the pin to work loose and at the same time the roller will be limited in its forward and rearward movements. Furthermore, the insertion of the pin is at a place where it is least apt to work out if for any unforeseen reason it should become dislodged from its retaining position in the passageway of the roller.

It will be understood that where we mention the annular portions of the pin fits within the walls 12, it does not necessarily mean a tight fit, as in fact, it might loosely fit within these walls and will still be locked from lateral movement.

The bearing is one that is also relatively cheap to manufacture, relatively light in weight, and readily and quickly assembled.

Many slight changes may be made without in any way departing from the spirit and scope of our invention.

Having thus described a preferred embodiment and one modified form, what we claim as new, and desire to secure by Letters Patent is:—

1. A side bearing comprising a base and two side walls on said base, flanges formed on the inner surfaces of said side walls, a roller movable within said side walls and said roller having a passageway therethrough, a portion of said passageway being enlarged, one of said side walls formed with an opening therein, an offset pin passed through said opening and through the passageway in the roller and locked within the passageway, the ends of said pin retained by said flanges and thereby holding the roller within said side walls and limiting the forward and rearward movement of the same.

2. A side bearing comprising a base, side walls formed on said base and having inner overhanging flanges and inner sloping end retaining flanges, a roller resting on said base and fitting between said side walls, said roller provided with a transversely extending passageway, the said passageway having inner walls that diverge from a central transverse axis, a pin insertable through an opening in either of said side walls and said pin being distorted and adapted to springingly lock within said passageway when forced therein and the ends of the pin retained by the flanges formed in the side walls to thereby hold the roller between said side walls.

3. A side bearing comprising a housing, a roller movable in said housing and said roller provided with a passageway therethrough, the said passageway formed to have different internal diameters, a pin insertable through an opening in said housing and said pin having a bent portion to abut against portions of the inner walls of the passageway and thereby lock in said roller, the housing so formed as to retain the pin therein after the pin is locked within the roller to thereby also to retain said roller in said housing.

4. A side bearing comprising a base plate having two upright side walls formed thereon, an inwardly extending flange formed completely about the edges of each side wall, a roller positioned between the side walls and having a transverse passageway therethrough, the central portion of said passageway enlarged, a pin insertable through an opening formed in the side walls and said pin angularly inclined between its ends and adapted to jam against the walls of the passageway when forced therein, the length of the pin being such that it is retained by the flanges of the side walls when said pin is within said roller to thus limit the forward and rearward movements of said roller.

5. A side bearing comprising a base plate and having two upright side walls formed thereon, an inner encircling flange formed on each of said side walls, a roller positioned between said side walls, and having an aperture extending therethrough, the said aperture enlarged midway of its length, a pin insertable through an opening formed in the side walls, the said pin being bent off center between its ends and adapted to jam slightly against the walls of the enlarged portions of said aperture, said pin being formed of two superimposed parts, and the length of the pin being such that it will be held at its opposite ends by the inner encircling flanges of the side walls when the pin is in position in the roller, the pin thus retaining the roller in its proper movable position between the said side walls.

6. A side bearing comprising a base plate having upright side walls thereon, a self-centering roller movable between said side walls and said roller having a passageway extending therethrough, one of said side walls formed with an opening near one of its ends, retaining means adapted to be passed through the opening in said side wall and to be forced into the passageway in said roller, and said retaining means formed to springingly lock within the roller when forced therein and the side walls so formed on their inner surfaces that they will cooperate with the retaining means locked within the roller and thus limit the forward and rearward movements of said roller.

7. A side bearing comprising a base plate having integral side walls formed thereon, a self-centering roller fitting between said side walls and said roller provided with a passageway of enlarged diameter midway between its ends, both of said side walls formed with openings near their opposite ends, retaining means adapted to be passed through any one of the openings in either of said walls, said retaining means being bent between its ends and the bent portion being adapted to lock within the enlarged portion of the passageway when the pin is forced within its final position in the roller each of said side walls formed with an encircling shoulder around its outer edge and on the inner surfaces of said side walls to thereby limit the movement of said pin and roller.

8. A side bearing comprising a base plate and only two upright walls thereon, a roller fitting between said walls and having a passageway therethrough, a pin jammed through said passageway and having a spring action within said roller to retain the pin therein and the upright walls formed to cooperate with the pin to limit the forward and rearward movement of said roller.

9. A side bearing comprising in part a roller, said roller provided with a passageway therethrough, said passageway enlarged at a point between its ends, a pin to fit within said passageway and said pin being bent between its ends, the bent portion adapted to spring within the enlarged portion of the passageway when said pin is inserted.

10. A side bearing comprising in part a roller, having a transverse passageway therethrough and the passageway enlarged midway between its ends to form sloping side walls, a pin angularly bent between its ends, adapted to first be driven within the passageway and then loosely fit therein, the angular portions of the pin retained against lateral movement by the said sloping sidewalls of the passageway.

11. A side bearing comprising in part a roller, having a passageway therein, said passageway being enlarged centrally of its ends, a pin having a central portion thereof parallel to the pin, but in a different plane and said pin adapted to be driven into said passageway and to spring into place, said pin loosely fitting within said passageway and held against lateral movement by the sloping walls formed in the passageway.

12. A side bearing comprising in part a roller, said roller provided with a passageway therethrough, said passageway enlarged at a point between its ends, a composite pin to fit within said passageway, one portion of said composite pin being bent between its ends and the bent portion adapted to spring within the enlarged portion of the passageway when the one composite portion of the pin is inserted, and the other composite portion of the pin when inserted holding the first mentioned part of the pin in place.

13. A side bearing comprising in part a roller having a transverse passageway therethrough and the passageway enlarged between its ends to form sloping side walls, a pin formed of two superimposed parts, one of said parts being bent between its ends and adapted to first be driven within the passageway and then loosely fit therein, the angular portion of the pin retained against lateral movement by the said sloping side walls of the passageway, and the second part of the pin contacting with the first part of said pin and holding the same in position.

14. A side bearing comprising in part a roller having a passageway therein, said passageway being enlarged centrally of its end, a pin formed of two superimposed parts, one of said parts angularly bent between its ends, and adapted to be placed within said passageway, and the other part of said pin then driven into said passageway and securely holding the first mentioned part of said pin in its desired position.

In testimony whereof we affix our signatures.

WILLIAM E. WINE.
WILLIAM F. CREMEAN.